(No Model.)
R. E. CARLTON.
FERTILIZER DISTRIBUTER.
No. 552,039.  Patented Dec. 24, 1895.
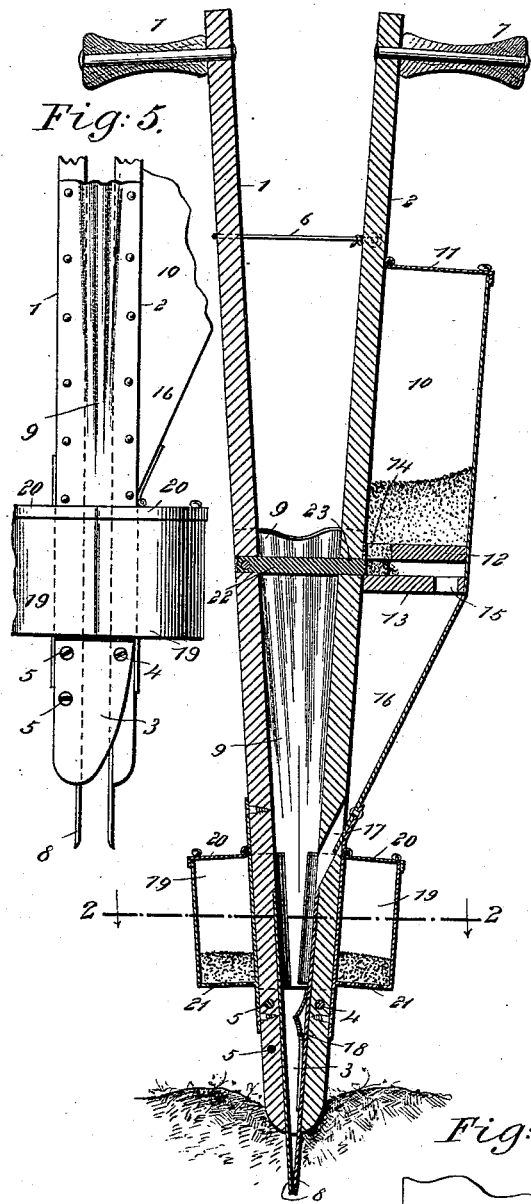
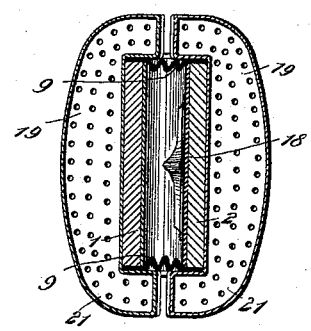
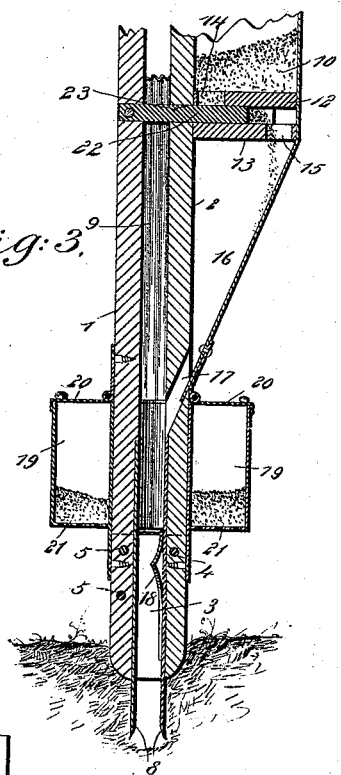
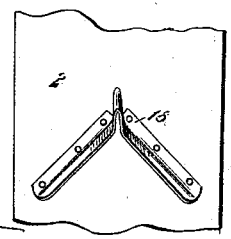
WITNESSES:
John A. Rennie
J. B. Owens
INVENTOR
R. E. Carlton
BY Munn & Co.
ATTORNEYS.

UNITED STATES PATENT OFFICE.

ROBERT E. CARLTON, OF BETHANY, KENTUCKY.

FERTILIZER-DISTRIBUTER.

SPECIFICATION forming part of Letters Patent No. 552,039, dated December 24, 1895.

Application filed July 9, 1895. Serial No. 555,401. (No model.)

*To all whom it may concern:*

Be it known that I, ROBERT E. CARLTON, of Bethany, in the county of Owen and State of Kentucky, have invented a new and Improved Fertilizer-Distributer, of which the following is a full, clear, and exact description.

This invention relates to an apparatus for distributing fertilizer preparatory to the setting of plants. In the raising of tobacco, corn, and many other plants it is desirable to supply the ground with a certain amount of fertilizer some time in advance of the planting or the transplanting of the plants, and it is the object of my invention to provide a superior device for applying this fertilizer.

It is further an object of my invention to provide more effective means for marking the place at which the fertilizer was deposited, so that weeks afterward when the planting is to be performed one may readily see the place in which the plants should be put.

These objects are attained by the mechanism illustrated in the accompanying drawings, all of which will be fully described hereinafter, and finally embodied in the claims.

Reference is to be had to the accompanying drawings, forming a part of this specification, in which similar characters of reference indicate corresponding parts in all the figures.

Figure 1 represents a vertical longitudinal section of my improved device. Fig. 2 is a horizontal section on the line 2 2 of Fig. 1. Fig. 3 is a vertical section of a portion of the device, showing it in a position different from that of Fig. 1. Fig. 4 is a detail view illustrating a device for spreading or scattering the fertilizer directly prior to its delivery, and Fig. 5 is a side elevation of a portion of the apparatus.

Reference-numerals 1 and 2 indicate duplicate sections, which comprise the main part of the device and are pivoted to each other at a point near their lower ends by means of two plates 3. These plates 3 are rigidly secured one to each side of the section 1 by means of bolts or screws 5 passing into the same, and the section 2 is pivotally connected to the plates 3 by means of a pin or screw 4, which passes through each plate, the connections being shown clearly in Figs. 1 and 3. The plates 3, in addition to serving as means for pivotally connecting the sections 1 and 2, also serve to inclose the lower portions of said sections, forming a chute, as shown in the drawings, so that the fertilizer will be confined in such chute in its downward passage.

6 indicates a loop, of wire or other material, which is affixed to the section 2 and embraces the section 1, and which serves to limit the extent of separation of the said sections 1 and 2. The upper ends of the sections 1 and 2 are provided with handle-grasps 7 for use in the manipulation of the device.

Let into the inner sides of the sections 1 and 2, and at the lower ends thereof, are the plates 8, which are duplicates of each other, and which project downwardly beyond the lower extremities of the sections 1 and 2. These plates are adapted to form spades or knives for entering the ground and for pushing the same aside to form an opening for the fertilizer, as is best shown in Fig. 3.

Rigidly secured to the edges of the sections 1 and 2, by means of tacks or other suitable securing devices, are the canvas sheets 9, which are two in number, one on each side of the device, and which form a collapsible hood and form a continuation of the plates 3.

10 indicates the fertilizer-receptacle, which is formed of sheet metal, is secured to the outer side of the section 2, and is provided with a swinging lid 11, by which its upper end may be closed. The receptacle 10 is formed with a double bottom composed of the sections 12 and 13, and the section 12 has formed therein an opening 14, which is directly adjacent to the section 2, and which establishes communication between the interior of the receptacle 10 and the space between the two sections of the bottom thereof. The outer portion of the bottom section 13 has formed therein an opening 15, similar in form to the opening 14, and which is provided to establish communication between the space inclosed by the sections 12 and 13 and the chute 16. The chute 16 tapers inwardly from the lower end of the receptacle 10, and has its lower end in communication with a passage 17 formed in the section 2. This passage 17 is formed above the plates 3, and by its means the fertilizer may be passed from the chute 17 into the space between the sections 1 and 2.

18 indicates a deflector-plate or spreading device for the fertilizer, said plate being fixed to the inner side of the section 2 and consisting of a plate bent to a V form, and with its angle uppermost, the said angular portion being larger than the lower portions, and the whole being arranged in the path of the fertilizer, so that it will be spread or scattered as the fertilizer descends. By these means the concentration of the fertilizer at one particular point is prevented, and the fertilizer is effectively spread over the entire surface of the opening shown in Fig. 3, to be formed by the plates 8.

The reference-numeral 22 indicates a plunger-plate, rigidly fixed to the section 1 and projecting horizontally and through an opening 23 formed in the section 2. This plunger-plate is capable of passing into the space between the bottom sections 12 and 13 of the fertilizer-receptacle, and its purpose is to push the fertilizer which enters through the opening 14 toward the outer side of the bottom and over the opening 15, through which it may fall, as illustrated in Fig. 3 of the drawings.

The device for marking the place whereat the fertilizer is deposited consists of two boxes 19, substantially C shape in cross-section, and which respectively embrace the outer sides and edges of the sections 1 and 2, their extremities projecting inward from said sides and edges, so that the two boxes will completely embrace said sections. The upper ends of the boxes 19 are provided with swinging lids 20, by which they may be closed, and the bottoms 21 of the boxes are perforated throughout their extent, so that powder contained in the said boxes may drop upon the ground.

In the operation of my invention, the box 10 is filled with any suitable fertilizer and the boxes 19 are filled with any powder which has a white or substantially-white color and which is insoluble. It is necessary that this powder be insoluble, to the end that it may withstand the rain which may fall upon it. The device is now held in the position shown in Fig. 1, and the contacted points of the plates 8 driven into the ground, as the said figure illustrates. When this has been accomplished the upper ends of the sections 1 and 2 are moved toward each other, so as to throw apart the lower ends and cause the plates 8 to push the dirt aside, as shown in Fig. 3. Simultaneously with this operation the plunger-plate 22 will pass through the space between the bottom sections 12 and 13 of the fertilizer-receptacle and push the fertilizer, which has entered said space by way of the opening 14, over and through the opening 15. The fertilizer will now gravitate down the chute 16, through the opening 17, and into the hole made by the plates 8. As the apparatus is pushed down into the ground the shock of said movement will cause a portion of the powder within the box 19 to be emitted from the openings in the bottom 21, and thus the deposit of the powder necessary for marking the space occupied by the fertilizer is attained.

Having thus described my invention, I claim as new and desire to secure by Letters Patent—

1. A fertilizer distributer, having two main sections pivotally connected to each other, fertilizer distributing mechanism carried by said sections, and two powder containing boxes substantially C-shaped in form and respectively embracing the two sections and having perforated bottoms, substantially as described.

2. In a fertilizer distributer, the combination of two main sections, a plate fixed to each side of one section and being pivotally connected to the remaining section, a fertilizer receptacle carried by one of the sections, means for dropping the fertilizer, and a powder-containing box carried by one of the sections and having a perforated bottom, substantially as described.

3. A fertilizer distributer comprising a frame movable into contact with the ground at each operation, a fertilizer receptacle, and a powder-containing box carried by the distributer and operating by and upon the engagement of the frame with the ground, substantially as described.

ROBERT E. CARLTON.

Witnesses:
S. L. CLEMENTS,
J. H. WATSON.